(12) United States Patent
Passerini

(10) Patent No.: US 8,087,353 B2
(45) Date of Patent: Jan. 3, 2012

(54) MACHINE HAVING AN IMPROVED DRAINING GRID FOR COMPACTING HUMID WASTE

(75) Inventor: Massimo Passerini, Mirabello (IT)

(73) Assignee: Wam S.p.A., Modena (IT)

( * ) Notice: Subject to any disclaimer, the term of this patent is extended or adjusted under 35 U.S.C. 154(b) by 188 days.

(21) Appl. No.: 12/526,086

(22) PCT Filed: Feb. 8, 2007

(86) PCT No.: PCT/IT2007/000083
§ 371 (c)(1),
(2), (4) Date: Aug. 6, 2009

(87) PCT Pub. No.: WO2008/096380
PCT Pub. Date: Aug. 14, 2008

(65) Prior Publication Data
US 2010/0077931 A1    Apr. 1, 2010

(51) Int. Cl.
*B30B 9/12* (2006.01)
*B30B 9/26* (2006.01)

(52) U.S. Cl. ......................................... 100/117; 100/127

(58) Field of Classification Search .................. 100/104, 100/117, 126, 127, 128
See application file for complete search history.

(56) References Cited

U.S. PATENT DOCUMENTS

| | | | |
|---|---|---|---|
| 3,256,808 A * | 6/1966 | Hunt | 100/117 |
| 4,397,230 A | 8/1983 | Hunt et al. | |
| 5,647,272 A * | 7/1997 | Paramest | 99/495 |

FOREIGN PATENT DOCUMENTS

| | | |
|---|---|---|
| DE | 102 46 397 A1 | 4/2004 |
| DE | 10 2005 000 779 A1 | 7/2006 |
| DE | 10 2004 059 571 B3 | 8/2006 |
| GB | 1 501 703 A | 2/1978 |
| JP | 2000 288794 A | 10/2000 |

* cited by examiner

*Primary Examiner* — Jimmy T Nguyen
(74) *Attorney, Agent, or Firm* — Pearne & Gordon LLP

(57) ABSTRACT

The machine (4) having an improved drainage grid (1) for compacting humid waste (2) comprises at least an Archimedes screw (7) which rotates internally of a containing structure (11) in which a support structure (13) is afforded for the grid (1). The drainage grid (1) comprises a perforated structure (16) shaped and connected to the fixed structure (13) in such a way as to maintain the perforated structure (16) continuously in contact with the helix (10) of the Archimedes screw (7).

6 Claims, 3 Drawing Sheets

MACHINE HAVING AN IMPROVED DRAINING GRID FOR COMPACTING HUMID WASTE

TECHNICAL FIELD

The invention relates to a machine having an improved draining grid for compacting humid waste.

BACKGROUND ART

The prior art has for some time described machines performing a compacting operation on damp solid refuse, for example from animal discharge gutters, but also from industrial processes, sewage discharge, livestock establishments, and in general from all processes producing solid waste containing a considerable quantity of water. The machines include the use of an Archimedes screw which transports the waste from a loading zone, in which the waste is introduced into the machine, for example by a hopper, towards a discharge zone in which the waste, after being freed of the humid part and compacted, is discharged. In the loading zone, or immediately downstream thereof, a perforated drainage grid is usually provided which enables an initial drainage of liquids in order to free the waste from the greater part of the liquids. The grid is generally placed at the start of the Archimedes screw as it is in this area that the liquid presence in the waste solids is at its greatest; the liquids in outlet from the grid are collected in an underlying zone of liquid collection, while the solid parts, freed from the liquids, are compacted and transported from the Archimedes screw to a discharge station situated downstream of the Archimedes screw.

The drainage grid includes an arched perforated portion which, during machine operation, must stay substantially in contact with the helix in order to optimise machine operation and enable transport of the solid substances as well as the drainage of the liquid.

The prior-art machines of this type exhibit some drawbacks. It has been noted that a solid body can become wedged between the drainage grid and the screw, which can cause, should the solid body be very hard (for example a stone), total arrest of the screw and can sometimes even damage it.

The aim of the present invention is to obviate the drawbacks encountered in the prior art by providing a machine in which the drainage grid adheres continuously to the screw helix.

An advantage of the present invention is that it maintains the grid in contact with the screw helix without there being any need for an operator to intervene.

A further advantage of the present invention is to enable the machine to continue functioning, without any danger of damage, even in cases where a solid body gets in between the grid and the screw helix.

These aims and more besides will be explained in more detail during the course of the following description, are substantially attained by the machine as it is described and claimed in the present patent application.

BRIEF DESCRIPTION OF THE DRAWINGS

Further characteristics and advantages will better emerge from the detailed description that follows, of a preferred but not exclusive embodiment of the machine of the invention, illustrated purely by way of non-limiting example in the enclosed figures of the drawings, in which.

DESCRIPTION OF PREFERRED EMBODIMENTS OF THE INVENTION

Figure 1:
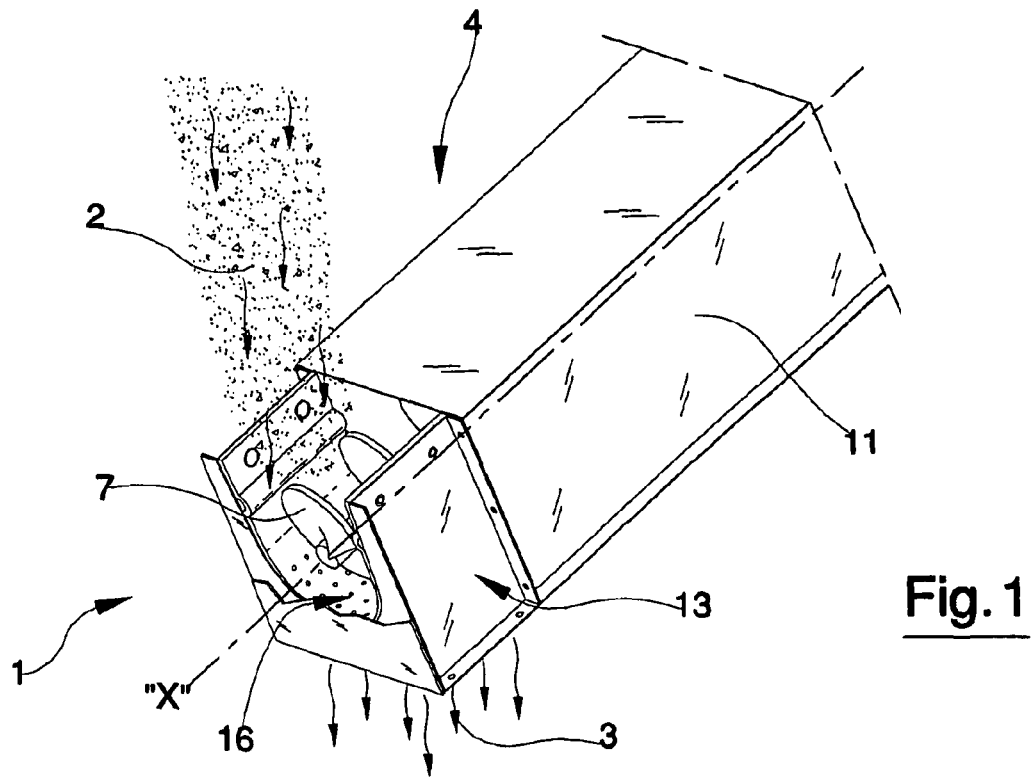
FIG. 1 is a schematic perspective view, with some parts partially removed and others completely removed, of the machine of the invention.

With reference to the figures of the drawings, 1 denotes in its entirety a drainage grid of a machine 4 destined for compacting humid waste.

As with known-type machines, the machine 4 comprises an Archimedes screw 7 which is rotated about a longitudinal axis X thereof by a motor (not illustrated in the figures) internally of a containing structure 11. The drainage grid 1 of the machine comprises a perforated structure 16 which exhibits at least an arched portion 17 which is predisposed to adhere against the helix 10 of the screw 7. The screw 7, which can be of any type, for example with or without a central shaft, is generally, though not necessarily, predisposed to rise in order to transport the solid waste in an upwards direction.

The humid waste 2 is introduced into the machine usually by means of a hopper (not illustrated); the rotation of the screw 7 enables the helix thereof to take and draw the solid substances present in the waste upwards; the liquids 3 contained in the waste strain through the drainage grid 3 and are discharged to the outside, while the compacted solid parts are discharged from the upper part (not illustrated) of the screw 7.

In the machine of the invention, the drainage grid 1 is provided with a fixed support structure 13 connected to the containing structure 11 of the screw 7. The fixed support structure 13 comprises two opposite lateral walls 14, substantially parallel to one another as well as to the rotation axis X of the screw 7, and two opposite front walls 15, substantially parallel and transversal to the lateral walls 14. The front wall 15 facing the containing structure further exhibits a cavity, a shape of which is substantially similar to the transversal profile of the housing conduit of the screw internally of the containing structure 11; the forward front wall can be closed, in a case where the waste is introduced from above, or can be provided with cavities in a case where the waste is frontally introduced.

As can be seen in the accompanying figures of the drawings, the drainage grid 1 comprises a laminar perforated structure 16, preferably made of a plastic material, and allowing only liquid substances contained in the waste 2 under treatment to pass through. The structure 16 is defined by at least an arched portion 17, perforated and predisposed to adhere against the helix 10 of the screw 7 during the screw 7 operation. Preferably the arched portion 17 exhibits a plurality of conical openings 17a, transversal dimensions of which progressively increase in a distancing direction from the screw 7 in such a way as to facilitate expulsion of the liquids and not to block due to the presence of solid bodies which might get into the openings.

As can be seen in the figures, the arched portion 17 develops in a profile which is identical to the profile of the shape of the helix 10 which profile is according to a perpendicular plane to the longitudinal development of the screw 7, in order to guarantee total adhesion of the arched portion 17 to the helix. In other words, the arched portion 17 and the helix 10 exhibit substantially the same arc of curvature, so that they are always in reciprocal contact.

A support portion 18 is engaged to the arched portion 17, which support portion 18 is predisposed to maintain the arched portion 17 in a substantially suspended position. The support portion 18 comprises at least two attachment elements 19 which are solidly constrained to the opposite ends 17b (FIGS. 3 and 4) of the arched portion 17; the attachment elements 19 connect, by means of suitable means for fastening 20, to the top of the respective lateral walls 14 of the fixed support structure 13.

Each drainage grid 1 advantageously further comprises means for regulating 21 which are operatively associated with the perforated structure 16 in order to maintain the arched portion 17 in contact with the helix 10 of the screw; in particular, the means for regulating 21 are operatively connected to the arched portion 17 in order to maintain the arched portion 17 in continuous contact with the helix. To this end, the means for regulating 21 are elastically deformable in order automatically to ensure a continual adhesion of the arched portion 17 to the helix 10. The elasticity of the means for regulating 21 further enables a distancing of the arched portion 17 from the helix 10 when the interposing of a rigid body 2a (FIG. 4) between the helix 10 and the arched portion 17 exerts one or more forces directed towards the arched portion itself. More specifically, when a rigid solid body 2a, such as for example a stone or another similar body, becomes interposed between the helix 10 and the arched portion 17, the means for regulating 21 deform, enabling a temporary separation of the arched portion 17 of the helix 10, by an amount which is sufficient to enable the solid body 2a to advance, moving over the helix 10 without causing arrest or damaging the screw 7.

In order to compensate the tendency to wear of each drainage grid 1 due to the dragging thereon of the helix 10, the means for regulating 21 are further elastically pre-tensioned to maintain the arched portion 17 continuously in contact with the helix 10. The means for regulating 21 press the arched portion 17 against the helix 10, ensuring continuous adhesion.

Still with reference to the figures of the drawings, the means for regulating 21 are associated to the support portion 18 of the drainage grid 1. The means for regulating 21 are preferably in a single piece with the attachment elements 19 of the support portion 18.

Figure 4:
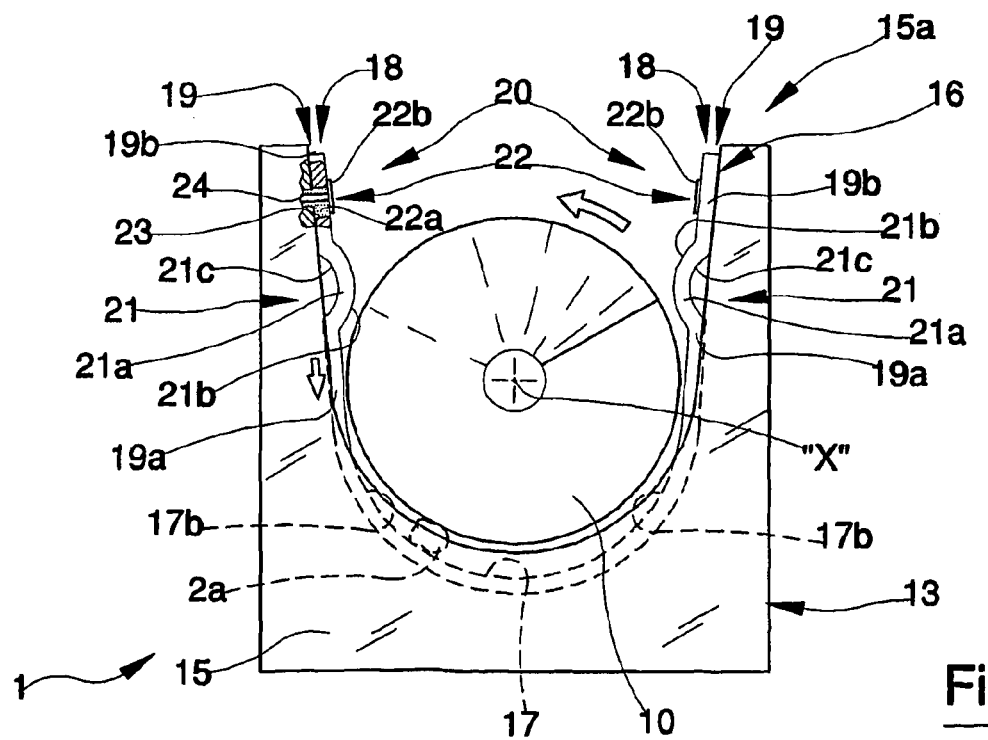
FIG. 4 is a schematic view of the grid and the Archimedes screw of FIGS. 1, 2 and 3, illustrated according to a transversal plane to the longitudinal development of the screw, in which a broken line indicates the grid in a distanced position from the screw.
Figure 2:
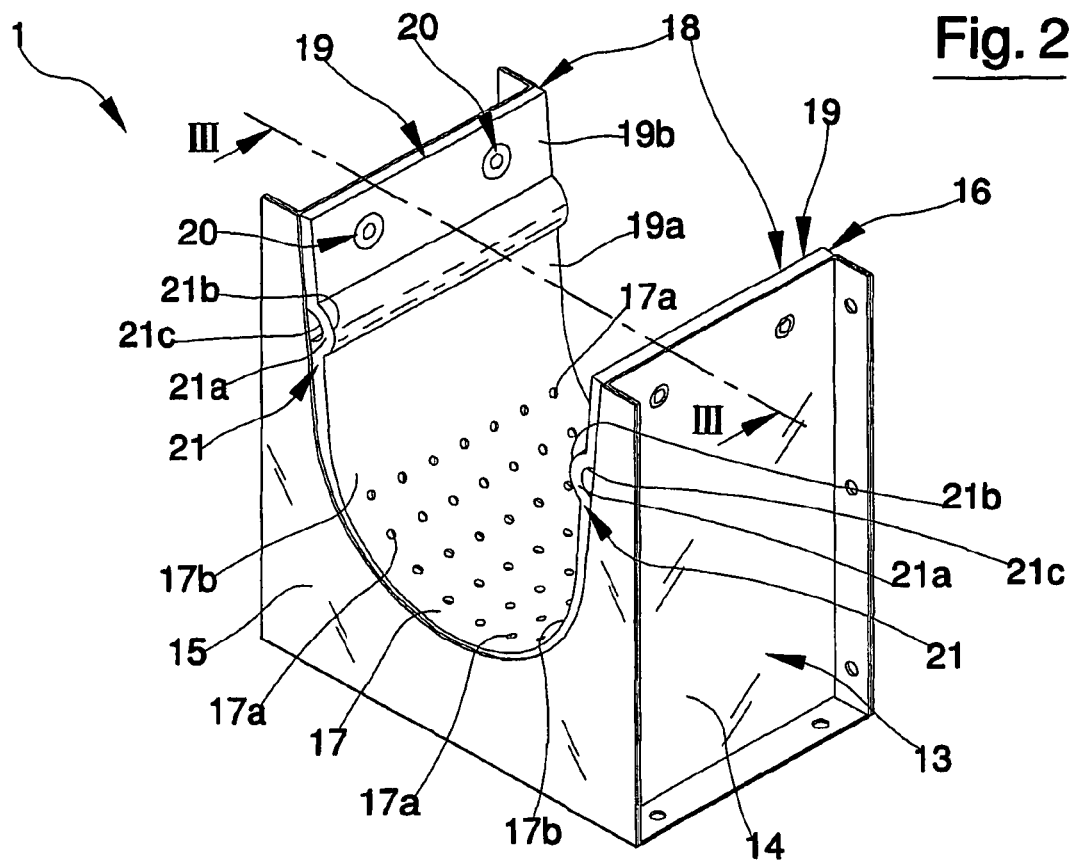
FIG. 2 is a perspective view of the grid of the machine of FIG. 1.
Figure 3:
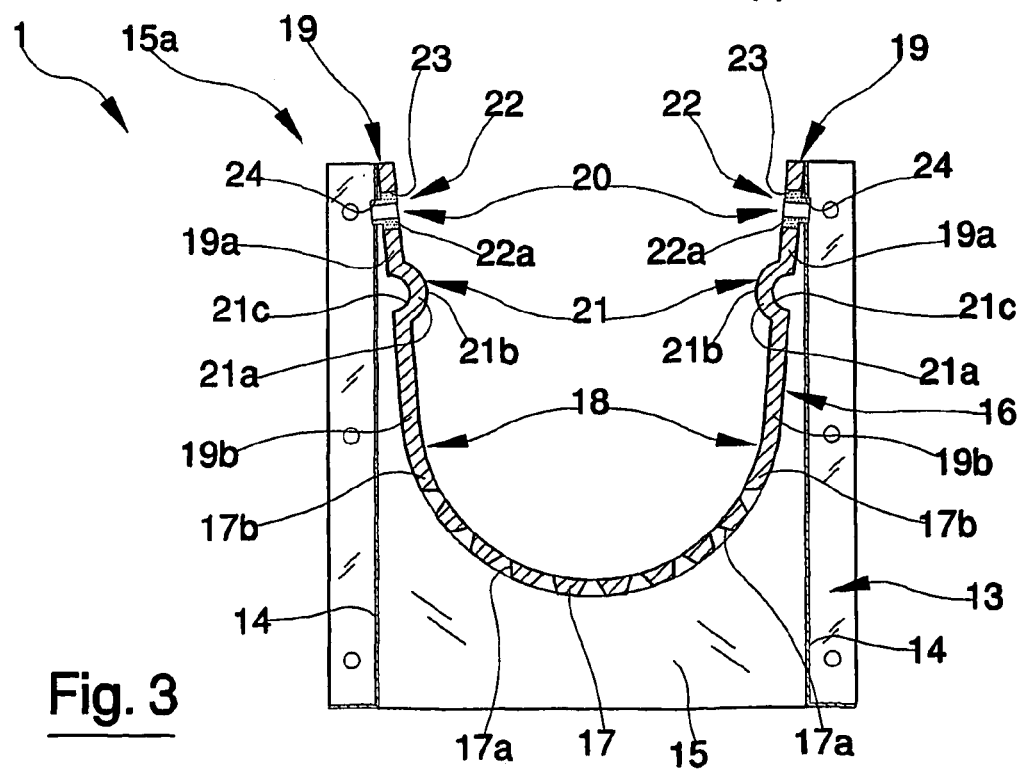
FIG. 3 is a section of the grid of FIGS. 1 and 2, made according to line III-III of FIG. 2.
Figure 5:
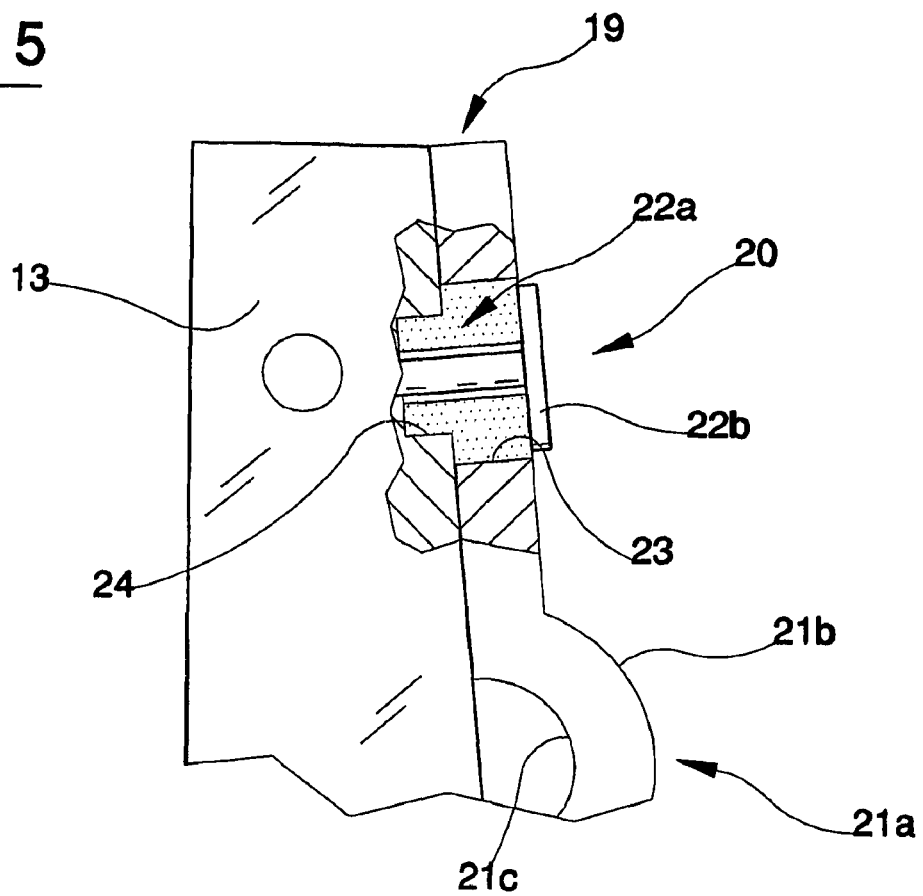
FIG. 5 is an enlarged scale illustration of a detail of FIG. 3.
Figure 6:
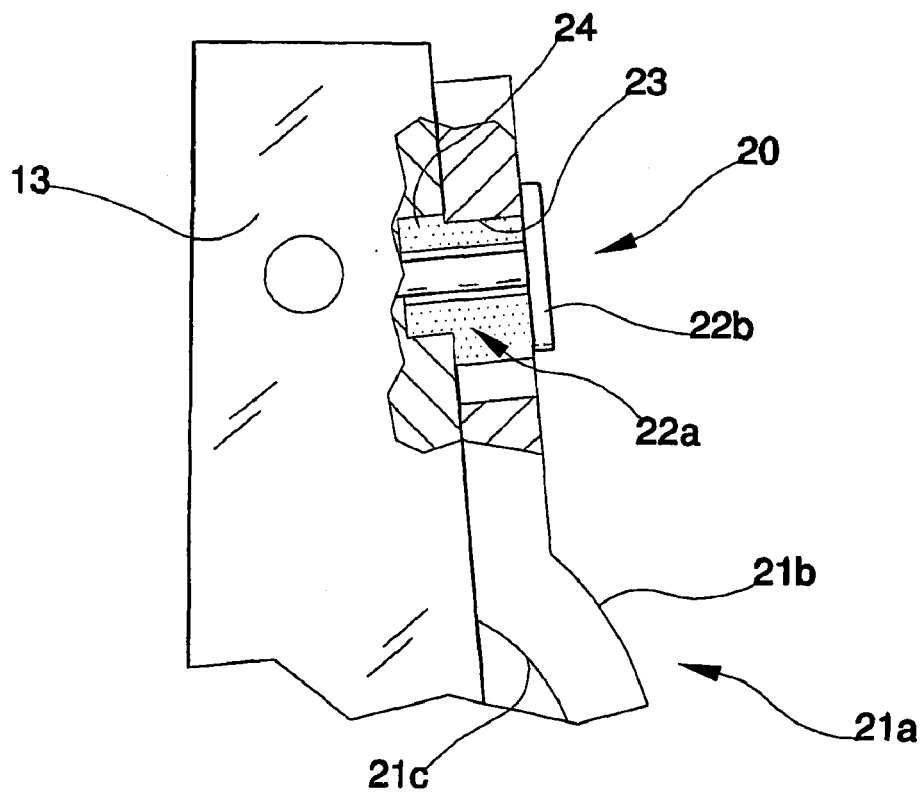
FIG. 6 is an enlarged scale illustration of a detail according to the broken line of FIG. 4.

As can be seen in FIGS. 3 and 4, the means for regulating 21 exhibit, for each attachment element 19, a lug 21a which develops transversally with respect to the preferential development of the attachment element 19 itself. Each lug 21a advantageously extends in a substantially curved development, preferably an arc of a circle, exhibiting opposite surfaces 21b, 21c (FIGS. 3 and 4) which are arched. The arched laminar structure of the lugs 21a behaves like a flat-spring curved in an arc of circumference, operating substantially by flexion.

Each lug 21a exhibits a convex surface 21b, facing towards the convex surface 21b of the opposite lug 21a, and a concave surface 21c facing towards the external environment. Both lugs 21a are arranged at a same distance from the arched portion 17 and subdivide the respective attachment element 19 into an intermediate segment 19a, interposed between the arched portion 17 and the respective lug 21a, and an end segment 19b which extends from the respective lug 21a on an opposite side with respect to the arched portion 17. Still with reference to FIGS. 3 and 4, the above-mentioned means for engaging 20 comprise, for each attachment element 19, at least a constraint 22 which is at least partially elastically deformable. In particular, each constraint 22 comprises at least a bushing 22a the structure of which is completely elastically deformable. The bushing 22a is preferably made of rubber or any other elastic material.

With reference to FIGS. 3 and 4, the bushing 22a is inserted in a through-hole 23 afforded in the respective attachment element 19, and a respective engagement opening 24 afforded in the fixed support structure 13 coaxially to the through-hole 23.

Each constraint 22 further comprises at least a coupling element 22b, for example a bolt, which is inserted in the hole of the bushing 22a from the side of the perforated structure 16 and which engages in the fixed support structure 13, for example by means of a screw-coupling.

The engagement of the cylindrical coupling elements 22b to the engagement opening 24 ensures a substantially stable position of the perforated structure 16 on the fixed support structure 13. However the perforated structure 16 is able to make slight translations and/or oscillations because of the deformability of the bushings 22a.

The invention solves the problems encountered in the prior art and attains the set aims.

Primarily, the object of the present invention enables an excellent drainage of the liquids when the waste is introduced into the machine.

Further, the elasticity and the pretensioning of the deformable structure of the drainage grids enables both a continuous adhesion to the arched portion, or screen, to the helix of the Archimedes screws, even following wear on the grids themselves, and a passage of rigid solid bodies which might be interposed between the grid and the helix during the above-mentioned separation operations. Given that the means for regulating, i.e. the deformable structures of the grid, are pretensioned, the grid itself can take up any structural wear deriving from continuous dragging of the helix of the screw. In particular, the arched portion is kept continuously in contact with the helix of the screw, preventing any undesirable formation of hollow spaces between arched portion and helix which might lead to insertion of solid bodies between the grid and the helix, and lower or even completely compromise machine performance. Further, any rigid bodies which might insert between the grid and the helix would be dragged by the helix and would exit the grid thanks to the "give" in the arched portion following a thrust against the normal elastic return thereof.

Naturally these advantages have important repercussions both on the quality of the separation operations and on the level of compaction of the final material obtained. In addition, it is worth stressing that the above-cited advantages have a positive effect on maintenance costs normally for repairing, replacing and/or cleaning the components of the machines constituting the treatment stations.

To summarise, the object of the invention provides a sort of "automatic recall of play", being the play existing between the grid and the helix of the Archimedes screw, and also provides an automatic and temporary distancing of the grid from the helix in order to enable passage of solid bodies which might have inserted between the two elements. The dimension of the run of the grid movements obviously depends on the size and shape of the above-described means for regulating, as well as on the size and the material the bushings 22*a* are made of.

It is noteworthy that the axial length of the grid can differ according to the type of application the machine is destined for. Further, in a same machine two or more of the above-described grids can be provided, according to needs.

The invention claimed is:

1. A machine (4) having an improved drainage grid (1) for compacting humid waste (2), of a type comprising at least an Archimedes screw (7) which is rotatable about a longitudinal axis (X) thereof, the drainage grid (1) comprising a perforated structure (16) having a lower portion defining an arched portion (17), the perforated structure (16) having opposing ends which define an opening extending between the opposing ends, the opening being located above the lower portion, the arched portion (17) being predisposed to adhere against a helix (10) of the Archimedes screw (7) and which enables liquid substances to pass, wherein the drainage grid (1) comprises means for regulating (21), associated with the perforated structure (16), which are elastically deformable in such a way as to determine a continuous adhesion of the arched portion (17) to the helix (10) of the Archimedes screw (7) and to enable a distancing of the arched portion (17) from the helix (10) following application of at least a force directed from the helix (10) towards the arched portion (17), wherein the means for regulating (21) are elastically pretensioned in order to maintain the arched portion (17) in contact with the helix (10) of the Archimedes screw (7), wherein the means for regulating (21) are associated to a support portion (18) at each end of the perforated structure (16), and the means for regulating (21) are located above a horizontal plane extending through the longitudinal axis (X).

2. The machine of claim 1, wherein the support portion (18) comprises at least two attachment elements (19), engaged at opposite ends (17*b*) of the arched portion (17), to which attachment elements (19) the means for regulating (21) are joined to make a single piece, the means for regulating (21) exhibiting, for each of the attachment elements (19), a lug (21*a*); each lug (21*a*) develops curvedly and exhibits a convex surface (21*b*) which faces towards the convex surface (21*b*) of the opposite lug (21*a*), and a concave surface (21*c*) facing in an opposite direction thereto.

3. The machine of claim 2, wherein each lug (21*a*) subdivides the respective attachment element (19) into an intermediate segment (19*a*), interposed between the arched portion (17) and the lug (21*a*) itself, and an end segment (19*b*) which develops from the lug (21*a*) towards an opposite end with respect to the arched portion (17).

4. The machine of claim 1, wherein it comprises: a fixed support structure (13) associable to a containing structure (11) of the Archimedes screw (7); means for engaging (20) provided with constraints (22) arranged on opposite sides with respect to the arched portion (17) and at least partially elastically deformable, for connecting the grid (1) to the fixed structure (13) in such a way that the grid (1) remains in a substantially suspended position internally of the fixed structure (13).

5. The machine of claim 4, wherein each constraint (22) comprises: at least an elastically deformable bushing (22*a*), which is inserted in a through-hole (23), afforded in the grid (1) wall, and in an engagement opening (24) afforded in the fixed support structure (13) coaxially to the through hole (23); a coupling element (22*b*), inserted in the bushing (22*a*), which engages in the fixed support structure (13).

6. The machine of claim 1, characterised in that the grid (1) is entirely made of a plastic material.

* * * * *